July 22, 1924.

O. E. GRIGSBY

WEATHER SHIELD AND GLARE VISOR

Filed Nov. 13, 1922     2 Sheets-Sheet 1

1,502,382

Inventor
Owen E. Grigsby.
By Jahl & Mueller Attys.

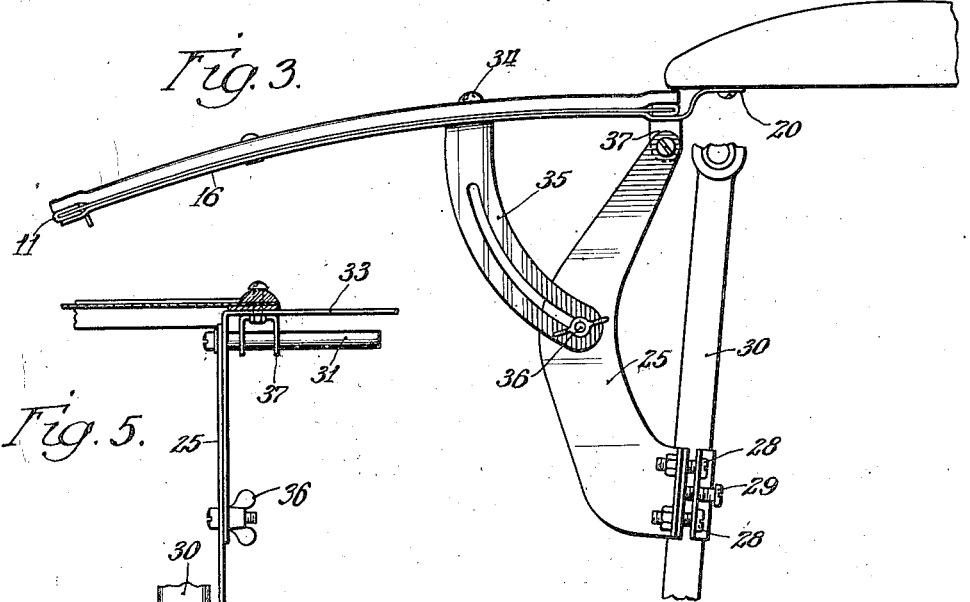
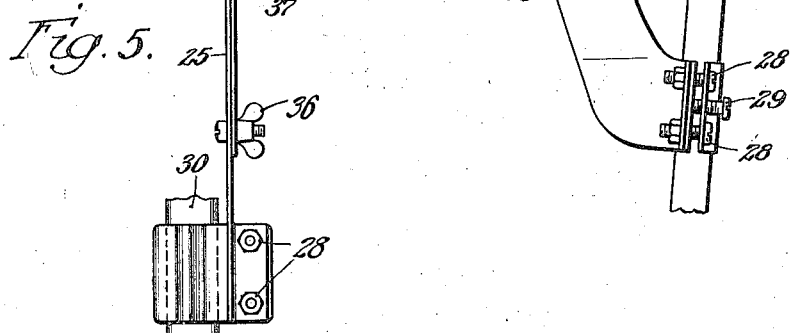
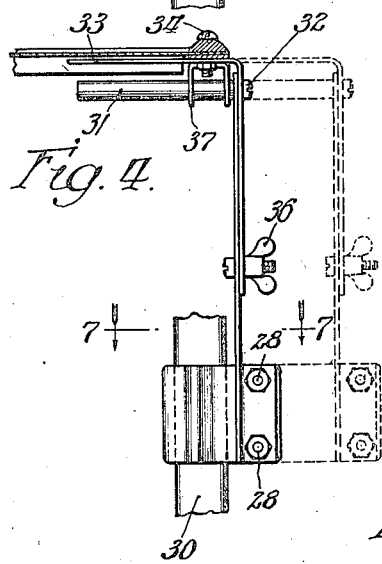
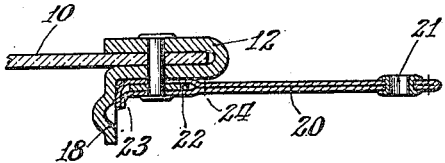
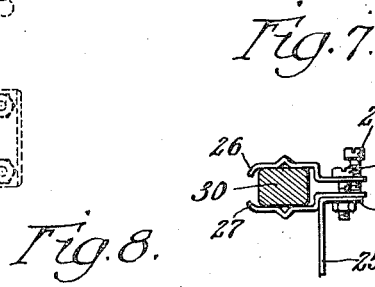
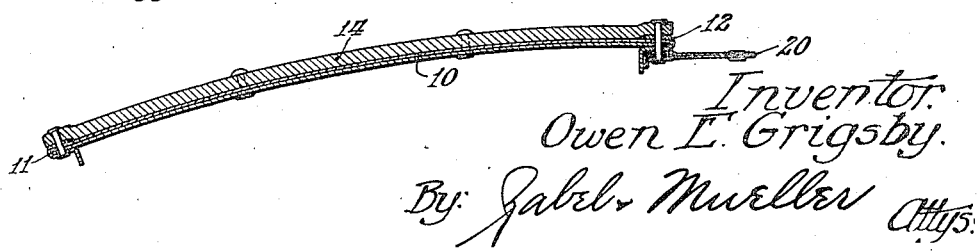

Patented July 22, 1924.

1,502,382

UNITED STATES PATENT OFFICE.

OWEN E. GRIGSBY, OF PARK RIDGE, ILLINOIS, ASSIGNOR TO GRIGSBY-GRUNOW-HINDS CO., OF CHICAGO, ILLINOIS, A CORPORATION OF ILLINOIS.

WEATHER SHIELD AND GLARE VISOR.

Application filed November 13, 1922. Serial No. 600,701.

*To all whom it may concern:*

Be it known that I, OWEN E. GRIGSBY, a citizen of the United States, residing at Park Ridge, in the county of Cook and State of Illinois, have invented a certain new and useful Improvement in Weather Shields and Glare Visors, of which the following is a full, clear, concise, and exact description, reference being had to the accompanying drawings, forming a part of this specification.

My invention relates to weather shield and glare visors for automobiles and has to do more particularly with visors of the above character adapted to be placed in front of the wind shield so as to protect it and also the driver.

An object of my invention is to provide an improved device of the above character, there being certain features of construction and arrangement of parts and operation more particularly set forth in the ensuing specification and appended claims.

One of the objects of my invention is to provide an improved construction whereby a visor having a visor member of intermediate length is associated with brackets adapted to be adjusted so that the visor may be attached to automobile windshields of the various cars now marketed. The windshield uprights of the cars on the market at the present time vary from about 35" centers to 44" centers. Heretofore visors have been made in which the brackets were supported beneath the visor body between the ends thereof. In such a device, it is of course necessary to make the visor body wider than the widest windshields, and as a result, if used on the narrowest windshield would project too far beyond the windshield to look right. Also in prior devices where the brackets are not adjustable, it was necessary to make visor bodies of different lengths for the different cars.

To overcome these objections I provide an arrangement in which I use a visor of intermediate length, supported upon reversible brackets adapted to be laterally adjustably mounted either beneath the visor or beyond the outer ends, so that it may be used on windshields varying from the narrow to the widest ones, as stated above, and still give a properly finished appearance.

I have illustrated the preferred form of my invention in the accompanying drawings, in which—

Fig. 3 is an end elevation of Fig. 1, but enlarged to more clearly show the parts;

Fig. 4 is a sectional view along the line 4—4 of Fig. 2, of one end of the visor, showing the bracket as in Figs. 1 to 3, that is, on the outside of the visor member for use on the wider windshields;

Fig. 5 shows the bracket mounted beneath the visor member for use on the narrower windshields;

Fig. 6 is a sectional view along the line 6—6 of Fig. 2 showing the frame construction enlarged.

Fig. 7 is a cross sectional view along the line 7—7 of Fig. 4, showing the method of mounting the bracket on the windshield uprights; and Fig. 8 is a cross-section along the line 8—8 of Fig. 2.

Figure 1:
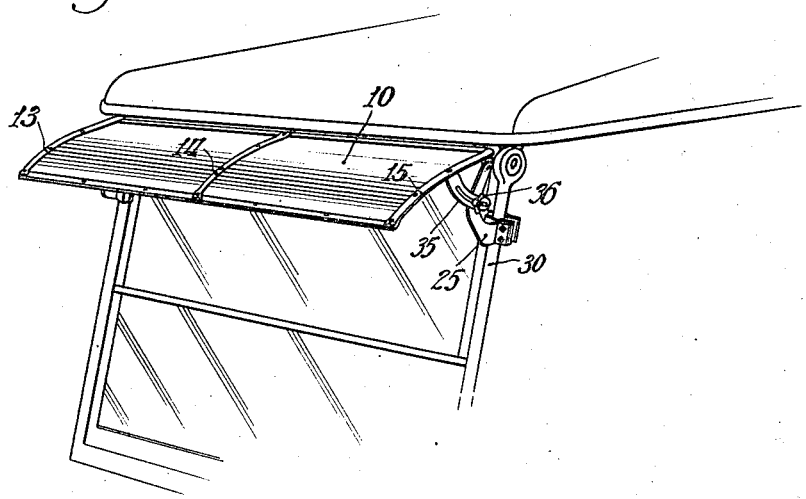
Fig. 1 is a perspective of my improved visor attached to an automobile.
Figure 2:
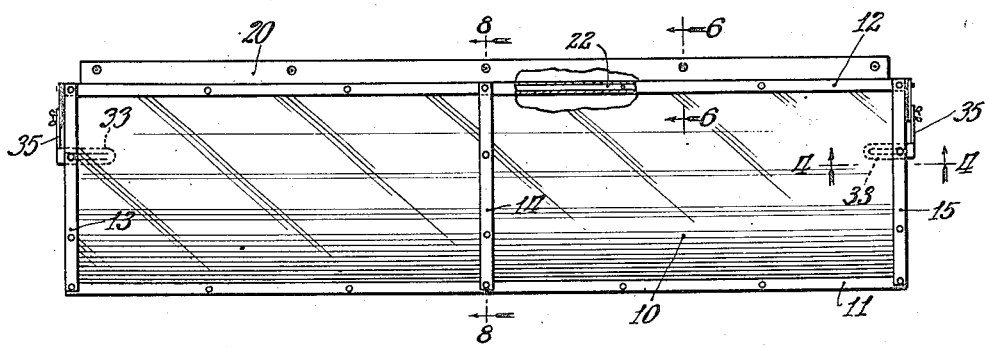
Fig. 2 is a plan view of the visor detached from the car.

Referring now more in detail to my invention as illustrated, I provide a suitable visor member, preferably comprising a flexible sheet 10, and for this purpose I have been employing a translucent material known as pyralin. Any desired color may be used, but I preferably employ a green tinted substance. In order to suitably hold the sheet I employ a frame which preferably has sufficient curve to it to give the necessary strength and resistance against wind pressure to the pyralin sheet. It is well known that such material when mounted flat and subjected to a pressure will readily give, and it is also well known that if such material is supported with sufficient curvature it is strengthened. I therefore curve it so as to sufficiently resist the wind pressure, to prevent undue permanent bending or damage.

The frame structure preferably 40" long as it thus fits cars within the above limits, consists of like but reversible front and rear longitudinal sections, 11 and 12 respectively.

The cross pieces consist of upper and lower members, the upper members 13, 14, 15 being alike in contour and arrangement, and the two outer lower clamping pieces 16 also being alike. The center lower brace differs slightly from the end pieces 16 in that the ends thereof are straight and are inserted between the lower sides of the sections 11, 12 and the sheet 10, as shown more clearly in Fig. 8. The frame pieces 11, 12 are slightly enlarged to permit the insertion of the ends of the center strip 14. In order to add sufficient rigidity to the frame I provide angular portions 18 as extensions of the strips 11, 12, and insert the sheet 10 between the opposing sides of the strips 11, 12, the parts being suitably held together by rivets. It will thus be seen that by the arrangement and construction of flat members employed, I am enabled to keep the number of different parts down to a minimum, simply reversing them. This is important in that it reduces the number of parts necessary to be kept in stock or run through in operation, and reduces the number of different kinds of operations to a minimum. Also by suitable bolts and rivets the flexible sheet is firmly clamped between the engaging parts of the frame.

In mounting the visor in front of the windshield of an automobile it is usually difficult to secure the rear end of the visor close enough to the car top to provide a weather proof connection, and therefore I provide a weather strip 20 preferably of a suitable water-proof fabric so as to yield according to the adjustment of the visor. This weather strip has suitable eyelets 21 therein for fastening it to the car top and is also preferably constructed so as to reinforce the visor frame. To this end I insert a steel strip 22 between the opposite faces of the weather strip, sewing the strip along 23, 24, to form a pocket for the reinforcing strip. This is then riveted to the rear frame member 12, as indicated more clearly in Fig. 6.

This steel reinforcement is desirable in the preferred form of my visor, where I use aluminum sheeting and aluminum bars for forming up the various frame sections. This is a light material and when shaped up as indicated and reinforced as pointed out, provides a very rigid frame although very light in weight. This is very desirable in that it is important that it add the least weight to the upper end of the windshield.

Now as to the bracket members for supporting the visor body member, I preferably provide an arrangement whereby a single size visor member will be suitable for use on all automobiles within prescribed limits, and by this I mean known cars now on the market, in which the windshields have a range varying from 35" to 44" between the supporting uprights. It will of course be understood that I am not limiting my invention to the use on any specific range, but mention the above because applying to the present commercial requirements.

In accordance with the above I provide a bracket construction consisting of right and left reversible members adapted to be attached to the visor body so that the brackets are supported either beneath the visor or beyond the outer ends thereof. In this way I am enabled to use a visor of an intermediate length and can secure the brackets so that regardless of their adjustment the device has a nice finished appearance.

Now as to the bracket construction, I preferably employ an arrangement one side of which is shown in Fig. 3, and which consists of right and left hand bracket members 25, secured to attaching clamps 26, 27 (Fig. 7) by clamping screws 28. A third screw 29 acts as a fulcrum and is adjusted according to the size of the windshield upright 30. It will be noted that the clamping plates 26, 27 are shaped so as to take either the square upright 30 or the round or oval type. The bracket 25 has two laterally extending arms for supporting the visor, consisting of a pivot shaft 31 reversibly attached to the bracket 25, preferably by means of a clamping screw 32. Thus the shaft may be attached to either side of the bracket, as indicated in Figs. 4 and 5. The second laterally projecting arm consists of an L-shaped member having the fastening portion 33 to which the visor is clamped by a bolt 34. The other portion of the bracket consists of a slidable slotted part 35 clamped to the side of the bracket 25 by the bolt and thumb nut 36. The pivot shaft 31 extends through a yoke member 37, attached preferably to the under side of the end of the visor frame. Thus the shaft 31 may be adjusted in the support 37 as desired. It is also to be noted that the supporting bracket arm 33 is slotted for the clamping bolt 34 to permit relative adjustment of the parts.

To install the visor, and assuming the car on which it is to be placed has windshield uprights 30 of the wider dimension, that is, so that the brackets are to be mounted on the outside of the visor as in Fig. 4, the clamping nuts of the bolts 34 are loosened so as to permit lateral adjustment of the brackets 25. The bracket clamping plates 26, 27 are also loosened so that they may be passed over the windshield uprights 30. The brackets 25 are then fastened to the uprights 30 so as to bring the visor close enough to the top of the car to permit attaching the weather strip 20 thereto. The brackets 25 being secured to the uprights 30 and with the braces 35 still adjustable at the clamping bolts 34, the visor is adjusted laterally of course to center between the windshield posts 30 before the flap 20 is attached. The clamping nuts 34 are now secured so as to clamp the braces 35 to the visor and the visor is then adjusted to the desired angle by means of the braces 35.

As indicated by the dotted line position of the brackets in Fig. 4, with the brackets mounted beyond the ends of the visor, a considerable adjustment is permitted for attaching the brackets to windshield uprights positioned beyond the outer ends of the visor.

Assuming that the visor is to be mounted upon windshield uprights which come within the outer ends of the visor, the brackets are reversed and mounted inside the outer ends of the visor as indicated in Fig. 5, that is, the construction is preferably such that I simply reverse the pivot shafts 31 and mount them on the outside of the brackets 25 and also reverse the braces 35 so that they extend outwardly from the bracket 25 as indicated in Fig. 5, instead of inwardly therefrom, as indicated in Fig. 4. This permits attaching the brackets 25 to posts 30 inside the outer ends of the visor and the adjustment at arms 31 and 33 allows for a considerable variation, depending of course upon the length of these parts 31, 33.

Above I have described the use of the device in connection with the usual open or touring type of body. I have arranged the brackets so that they may be readily changed to be attached to the closed body with the wooden or flat faced front or frame. When used in this manner it is only necessary to remove the clamping plates 26, 27 and attach the brackets 25 by means of the angular portion 25' thereof directly to the front face of the body. In such case the brackets are adjustable and reversible also, so that the device may be used on the same range of sizes as with the open body as previously described.

What I claim as new and desire to secure by United States Letters Patent is:

1. A weather shield and glare visor for automobiles comprising a visor member, a bracket at each end of the visor for attachment to wind shield uprights, each bracket comprising an upright member having an attaching clamp at its lower end, a horizontal shaft reversibly secured to the upper end of the bracket, and pivotal supports for the shaft attached to the visor to permit adjustable insertion of the shaft with the bracket either beneath the visor or beyond the outer end thereof.

2. An attachment for securing visors to automobile wind-shield uprights comprising right and left hand brackets each having two reversibly mounted lateral arms with means whereby each two arms may be attached to a visor with said arms extending to one side or the other of the bracket so as to fit uprights different distances apart, one of each two arms being a pivot member for the visor and the other arm adjustable to lower and raise the visor.

3. An attachment for securing visors to wind-shield frames comprising a bracket having an L shaped attaching end one leg of which extends laterally from the face of the wind-shield, a pair of adjustably mounted clamping plates carried by the lateral leg for embracing a wind-shield standard, said plates being removably attached to the bracket by clamp plate operating bolts whereby the lateral leg may be directly attached to the face of the wind-shield frame by removing the plates.

4. A frame for a weather shield and glare visor for holding a flexible sheet comprising a strip aluminum marginal member, and a reinforcement therefor including a sack-like fabric weather flap therefor having a steel strip sewed therein and all secured along on a marginal side of the frame.

5. A weather shield and glare visor for automobiles comprising a visor member, a bracket for each end of the visor for attachment to the windshield uprights of an automobile, each bracket comprising a flat upright member having a laterally extending shaft for longitudinally adjustable insertion in a support carried by the visor whereby the visor is pivotally supported thereby, a pair of clamping plates for embracing the windshield uprights loosely carried by a lateral extension of the bracket upright, and clamping bolts extending thru the clamping plates and lateral extension for applying the clamping plates and also clamping the bracket upright to the plates by a single operation thereof.

In witness whereof I hereunto subscribe my name this 14th day of October A. D., 1922.

OWEN E. GRIGSBY.